United States Patent
Lehtovaara et al.

(10) Patent No.: US 7,874,950 B2
(45) Date of Patent: Jan. 25, 2011

(54) TENSIONER WITH REINSTALLATION FEATURE

(75) Inventors: Jorma J. Lehtovaara, Mississauga (CA); Marek Frankowski, Innisfil (CA)

(73) Assignee: Litens Automotive Inc., Woodbridge (CA)

( * ) Notice: Subject to any disclaimer, the term of this patent is extended or adjusted under 35 U.S.C. 154(b) by 124 days.

(21) Appl. No.: 11/908,636

(22) PCT Filed: Mar. 20, 2006

(86) PCT No.: PCT/CA2006/000413
§ 371 (c)(1),
(2), (4) Date: Sep. 14, 2007

(87) PCT Pub. No.: WO2006/099724
PCT Pub. Date: Sep. 28, 2006

(65) Prior Publication Data
US 2009/0011881 A1    Jan. 8, 2009

(51) Int. Cl.
*F16H 7/12* (2006.01)
(52) U.S. Cl. .................... 474/135; 474/112
(58) Field of Classification Search ............ 474/135, 474/133, 112
See application file for complete search history.

(56) References Cited
U.S. PATENT DOCUMENTS

| | | |
|---|---|---|
| 4,145,934 A | 3/1979 | Sragal |
| 4,351,636 A | 9/1982 | Hager |
| 4,392,280 A | 7/1983 | Gavagan |
| 4,583,962 A | 4/1986 | Bytzek et al. |
| 4,634,407 A | 1/1987 | Holtz |
| 4,725,260 A | 2/1988 | Komorowski et al. |
| 4,808,148 A | 2/1989 | Holtz |
| 4,822,322 A | 4/1989 | Martin |
| 4,824,421 A * | 4/1989 | Komorowski ............ 474/135 |
| 4,832,665 A | 5/1989 | Kadota |
| 4,834,694 A | 5/1989 | Martin |

(Continued)

*Primary Examiner*—Robert A Siconolfi
*Assistant Examiner*—Anna Momper
(74) *Attorney, Agent, or Firm*—Clark Hill P.L.C.

(57) ABSTRACT

A tensioner enables easy and reliable reinstallation of the tensioner and belt in the field service while simultaneously making it possible to utilize a one-way clutch device to ensure continuous belt tension control without cumbersome manual alignment and/or realignment procedures. The tensioner has a pivot shaft configured for mounting on an engine surface. A tensioner arm is mounted on the pivot shaft for pivotal movement between a free arm stop position and premount stop position. A belt-engaging pulley is mounted for rotation on the tensioner arm. A base cup is rotatably mounted around an end of the pivot shaft. The base cup has an arcuate slot having a free arm stop end and a premount stop end. The tensioner arm cooperates with the arcuate slot limiting the pivotal movement of the tensioner arm. A spring is coupled between the tensioner arm and the base cup biasing the tensioner arm in a belt-tensioning direction. An anti-kickback stop mechanism engages the pivot shaft and has a lost motion connection with the tensioner arm wherein the tensioner arm moves through a free range without engaging the anti-kickback mechanism. The tensioner arm 1) rotates the anti-kickback mechanism as the tensioner arm moves beyond the free range towards the premount stop position and 2) enables the anti-kickback mechanism as the tensioner arm moves beyond the free range towards the free arm stop position, limiting travel of the tensioner arm therebeyond. The spring is fixable relative to the pivot shaft upon the tensioner being mounted on the engine surface.

12 Claims, 4 Drawing Sheets

U.S. PATENT DOCUMENTS

| | | |
|---|---|---|
| 4,917,655 A | 4/1990 | Martin |
| 4,923,435 A | 5/1990 | Kadota et al. |
| 5,156,573 A | 10/1992 | Bytzek et al. |
| 5,470,279 A | 11/1995 | Brandenstein |
| 6,083,130 A * | 7/2000 | Mevissen et al. ............... 474/70 |
| 6,264,578 B1 | 7/2001 | Ayukawa |
| 6,375,588 B1 | 4/2002 | Frankowski et al. |
| 6,416,435 B1 | 7/2002 | Szatkowski et al. |
| 2003/0017894 A1 * | 1/2003 | Kaiser et al. ................. 474/112 |
| 2004/0072641 A1 | 4/2004 | Nakamura |
| 2006/0035740 A1 | 2/2006 | Lehtovaara et al. |
| 2006/0068957 A1 * | 3/2006 | Stone et al. .................. 474/135 |

\* cited by examiner

TENSIONER WITH REINSTALLATION FEATURE

FIELD OF THE INVENTION

The present invention relates to a tensioning devices for maintaining an approximate, predetermined optimum tension on endless drive belts, which may be toothed, for use with internal combustion engine drive systems and more particularly to spring-biased eccentric devices which have one-way mechanism to control the movement of the tensioning arm towards and away from the belt directions.

BACKGROUND OF THE INVENTION

There are several known tensioner designs where the tensioner arm movement towards the drive belt is controlled with a one-way mechanism. U.S. Pat. No. 4,145,934 describes a wedge that is pushed against the arm eccentric (lever) so that latter cannot rotate outwards once the tensioner arm is biased towards the belt by a tensioning spring.

U.S. Pat. No. 4,351,636 describes a tensioner similar in principle except that the one-way wedge is replaced by a ratchet/pawl assembly.

Another ratchet and pawl mechanism is described in U.S. Pat. No. 4,634,407.

U.S. Pat. No. 4,392,280 describes a device where the one-way mechanism consists of either a one-way roller clutch or a spring clutch placed between the tensioner arm and the pivot shaft.

All of the above-mentioned inventions describe a one-way mechanism, which does not allow the tensioner arm rotate away from the belt once the arm is allowed to move inwards towards the belt.

U.S. Pat. No. 4,583,962 offers an improvement to these designs by describing a mechanism that allows a limited return stroke of the arm towards the backstop, required by the thermal expansion of the engine. The detail design of this patent describes a spring clutch type one-way device and an arc shape slot wherein the arm is free to rotate backwards.

U.S. Pat. No. 4,808,148 describes a design wherein the slot controlled reverse stroke is replaced by a resilient biasing element such as elastomeric spring located between the ratchet and pawl assembly and the stationary mounting member.

U.S. Pat. Nos. 4,822,322 and 4,834,694 describe inventions wherein the one-way mechanisms are conventional on-way (roller) clutches and the arm return strokes are controlled by arc shaped slots.

All of the above mentioned designs, even if they allow some limited return stroke to compensate thermal expansion of the engine block, do not allow a total return of the tensioner arm to pre-installation position, which will be required if there is a need to reinstall the current belt after a field service or even more so, if the installation of a new, unstretched belt is required.

There have been some proposals to overcome the reinstallation problem described above.

U.S. Pat. No. 4,917,655 has a plurality of arc shaped slots, which control the movement of the spring clutch and a suggestion that the spring clutch can be forced to move against its locked, non-return direction.

U.S. Pat. Nos. 4,923,435 and 6,375,588 describe tensioners wherein there is a viscous clutch installed in series with a one-way mechanism between the tensioner arm and stationery part of the tensioner. In these cases, the arm can be forced away from the belt by overcoming the viscous friction forces in the viscous clutches.

All of these designs have a serious drawback, since the return torques required to rotate the arm away from the belt are very high. In case of forcing the viscous clutch, if the turning speed is not very slow, the operator is most likely to damage some components in the tensioner. On the other hand, the reverse movement of a simple spring clutch, as described in U.S. Pat. No. 4,917,655, is most likely to result in bent spring tangs rather than release of the clutch. This is due to the fact that spring clutches are extremely sensitive to the manufacturing tolerances of the spring wire, the spring coils and the shaft diameter as well the level of the coefficient of friction which is highly unpredictable especially in dusty engine compartment environment in used, older cars.

For the same reason, this particular design cannot properly control the exact angular return stroke since, depending on the actual release torque of the clutch spring towards the belt tightening direction, the spring tang and the first two coils adjacent to this tang are bending and opening unpredictably therefore changing the actual stroke angle between the stops.

The design, described in U.S. Application No 60/335,801 does provide a practical and reliable solution for releasing the tensioner arm away from the belt for reinstallation purposes. However, this design, similarly to the three above-mentioned ones, requires a multitude of expensive, high precision components which also increase the size and the weight of the tensioner, all this highly undesirable in modern motor car engines. This design also has the disadvantage of not controlling the release torque well enough. Although the first coils are prevented in opening excessively, the each and every one of the rest of the coils—when being opened to release the clamping fit on the clutch core—must still take a support on the core therefore increasing the frictional drag which increases the peak values and variations in the release/back torque of the clutch.

While the use of one-way clutches together with the built-in limited thermal expansion stroke features have made it possible to simultaneously use the main spring to automatically take care of the installation stroke and to extend the overall operation range of the tensioners thereby allowing longer belt stretch, this design concept has introduced another so far unsolved technical problem. In order to control the belt tension over a wider angular stroke has made it necessary to use main springs with much lower spring rates than what is case in the conventional short stroke tensioners. The lower spring rates dictate the springs being much longer—i.e. having more coils—and the prewinding angles have become larger. These spring designs have a distinctive drawbacks, the natural frequency of the spring gets lower and springs are easily distorted when wound with large preload angles. This, on the other hand, make the springs much more suspect for excessive vibrations during the service leading to premature fatigue failures of the spring resulting in damaged engines.

SUMMARY OF THE INVENTION

The present invention provides a tensioner that allows easy and reliable reinstallation of the tensioner and belt in the field service while simultaneously making it possible to use one-way clutch device to allow easy and continuous belt tension control without cumbersome manual alignment and/or realignment procedures.

It is desirable to overcome variations in the release/back torque of the spring type one-way clutch caused by the bending of the clutch spring tang and/or the adjacent coils during the rotational movement of the clutch in the belt tightening direction.

It is further desirable to provide a support for the force carrying tang of the spring type one-way clutch to avoid excessive bending or yielding when the clutch acts as a backstop preventing the arm movement away from the belt.

It is further desirable to provide a design that isolates the clutch from the sudden short time vibratory movements of the tensioner arm so that the one-way clutch is not rotated when the arm is traveling in its path away from the cold engine position.

It is further desirable to provide a low noise tensioner by eliminating metal to metal contact in the arm stops during the running of the engine.

It is further desirable to introduce into the tensioner features that limit excessive spring distortion and vibration therefore avoiding spring fatigue failures.

While the principles of the present invention can be adapted to be used in connection with any one-way device, they are especially suitable for the self-adjusting tensioner where the operating range of the arm is controlled by one-way device of a spring clutch type, where the one-way device is functionally located between the arm and the pivot shaft.

According to one aspect of the invention, there is provided a tensioner having a pivot shaft configured for mounting on an engine surface. A tensioner arm is mounted on the pivot shaft for pivotal movement between a free arm stop position and premount stop position. A belt-engaging pulley is mounted for rotation on the tensioner arm. A base cup is rotatably mounted around an end of the pivot shaft. The base cup has an arcuate slot having a free arm stop end and a premount stop end. The tensioner arm cooperates with the arcuate slot limiting the pivotal movement of the tensioner arm. A spring is coupled between the tensioner arm and the base cup biasing the tensioner arm in a belt-tensioning direction. An anti-kickback stop mechanism engages the pivot shaft and has a lost motion connection with the tensioner arm wherein the tensioner arm moves through a free range without engaging the anti-kickback mechanism. The tensioner arm 1) rotates the anti-kickback mechanism as the tensioner arm moves beyond the free range towards the premount stop position and 2) enables the anti-kickback mechanism as the tensioner arm moves beyond the free range towards the free arm stop position, limiting travel of the tensioner arm therebeyond. The spring is fixable relative to the pivot shaft upon the tensioner being mounted on the engine surface.

According to another aspect of the invention, there is provided a tensioner comprising a pivot shaft, a base cup rotatably mounted around the bottom end of the pivot shaft, an arm pivotally mounted about the pivot shaft, a pulley/bearing assembly mounted eccentrically onto the arm, a torsion spring installed between the base cup and the arm to bias the arm towards a drive belt and a one-way spring clutch mounted between the arm and the pivot shaft. The spring clutch is arranged to have its release/free rotation direction in such a way that the arm is relatively free to rotate towards the belt but can only move away from the belt by the amount of an angular stroke limited by the free play between the spring clutch and the arm. For the simplified installation it is preferred to also have an installation pin which can lock the arm with the base so that the pulley of the tensioner stays as far as possible away from the belt during the initial stage of the installation of the tensioner and the belt onto the engine. Due to the fact that the pivot shaft is not rotationally locked to the base cup and the lower (stationary) tang of the main spring, the arm, together with the one-way device and the pivot can be manually rotated away from the belt whenever the mounting bolt is not fully tightened to the engine.

According to another aspect of the invention there is provided the spring clutch is encapsulated by clutch sleeve that will prevent the excessive opening of the clutch spring coils. This clutch sleeve is preferably made out of plastic or elastomer type material and can be formed also to support the load carrying tang of the clutch spring as well as to isolate any direct metal to metal contact between the tensioner arm and the clutch spring. Both of the above-mentioned embodiments can further have two distinctive features to limit the distortion and vibration of the spring. The first one is to form at least one end, but preferably both ends, of the spring cavity as helix which closely matches the theoretical pitch of the spring coils at their nominal or near nominal position. The second one is to provide a spring support that will extend at least a half length of the spring cavity to restrict the radial vibration of the spring coils. The anti-vibration spring support is preferable made of plastic or elastomer type materials to reduce the wear and the noise of the spring.

BRIEF DESCRIPTION OF THE DRAWINGS

The above-mentioned features and advantages of the present invention will be more fully appreciated from the following detailed description when considered in connection with the accompanying drawings, in which the same or like reference numbers designate the same corresponding parts throughout and in which.

DETAILED DESCRIPTION OF THE INVENTION

Figure 1:
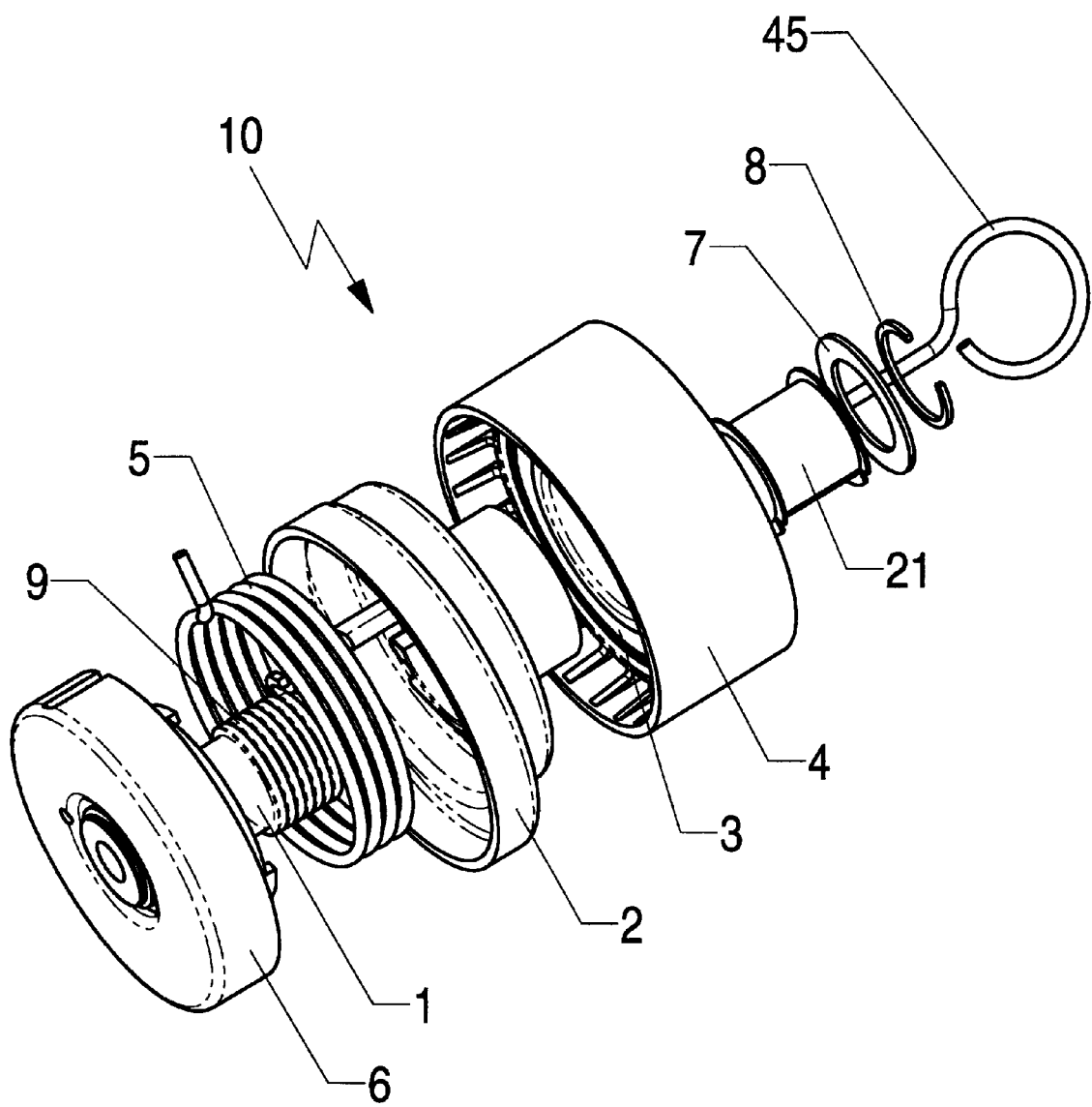
FIG. 1 is an exploded side perspective view of a tensioner in accordance with the present invention.
Figure 3:
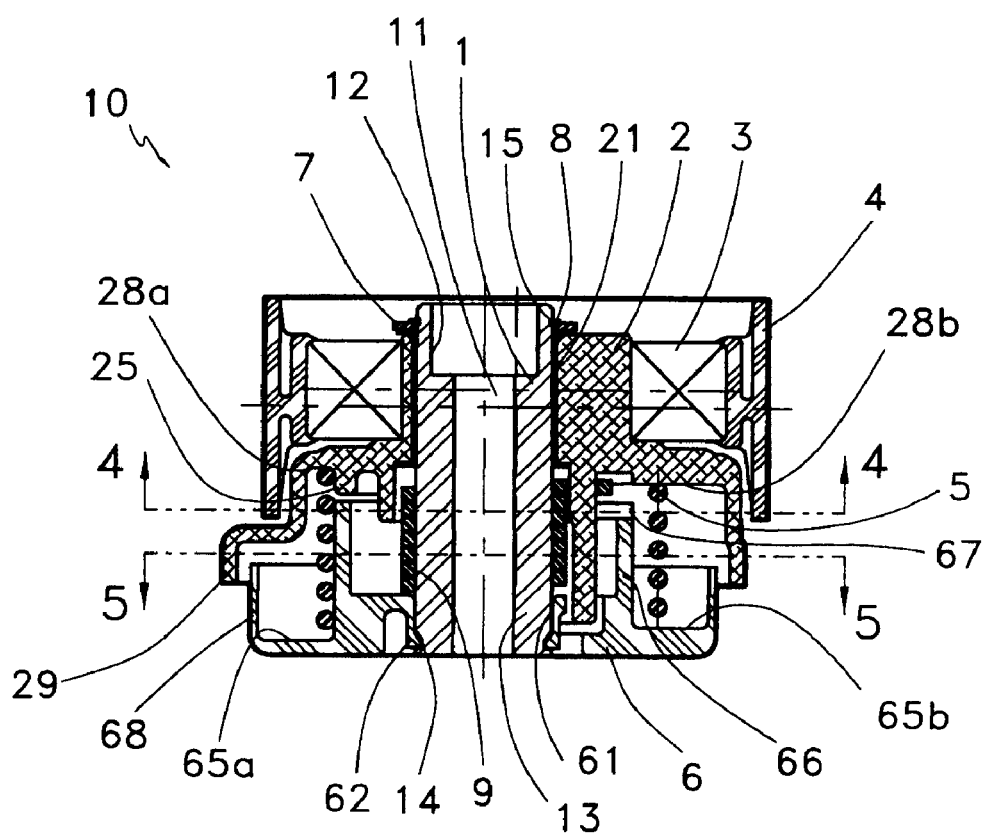
FIG. 3 is a cross-sectional side view of the tensioner taken through the line 3-3 in FIG. 2.

A tensioner in accordance with the present invention is indicated generally at 10 in FIGS. 1 and 3. As shown, the tensioner 10 comprises a pivot shaft 1, arm 2 including a pivot bushing 21 rotationally mounted about the pivot shaft 1, a bearing 3 mounted on the arm 2 carrying a pulley 4, a main spring 5, a base cup 6, a top washer 7, a lock ring 8 and a clutch spring 9.

The pivot bushing 21 allows the arm 2 rotate about the centre axis of the pivot shaft 1 while being biased towards the belt (not shown) by the main spring 5 mounted between the arm 2 and the base cup 6 and/or a corresponding spring tang mounting slot in the engine (not shown). The top washer 7, while being prohibited to move axially out from the pivot shaft 1 by the lock ring 8, placed into a ring groove 15 of the pivot shaft 1, will prevent the arm 2 moving out of its position on and around the pivot shaft 1. The arm 2 also has a tooling hole 27 formed on its top face to allow the arm 2 being rotated away from the belt during the field service work of the engine.

The mounting connection between the pivot shaft 1 and the base cup 6 allow a relative rotational movement between these two components but will not allow the parts separate axially.

According to FIG. 3, this has been established by pushing the bottom end 13 of the pivot shaft 1 into a loose fitting hole 61 of the base cup 6 while the flexible lip or fingers 62 of the base cup 6 clip into a corresponding groove or grooves 14 of the pivot shaft 1 holding the parts axially together.

Figure 4:
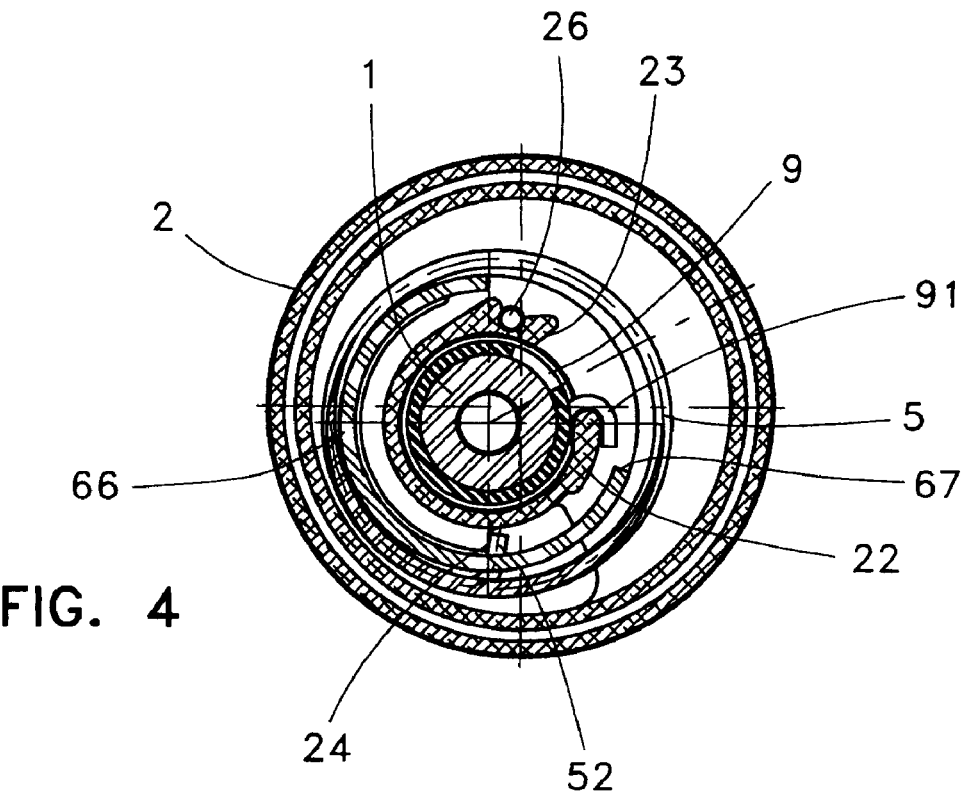
FIG. 4 is a cross-sectional view taken through the line 4-4 in FIG. 3 emphasizing the positional relation between the clutch spring and the arm pin.
Figure 5:
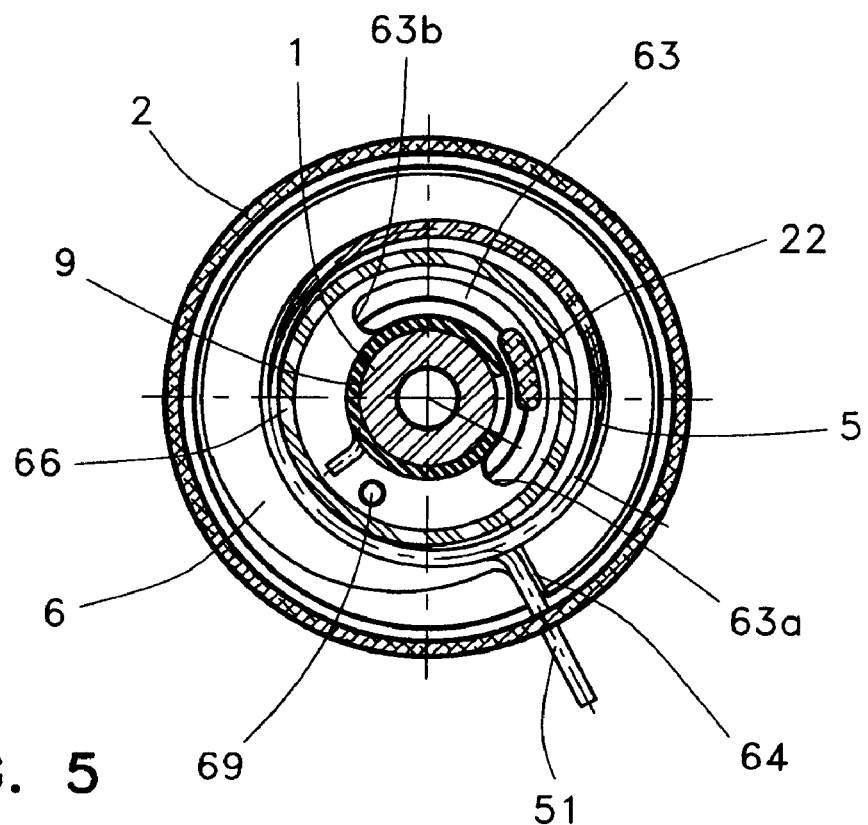
FIG. 5 is a cross-sectional view taken through the line 5-5 in FIG. 3 emphasizing the positional relation between the arm pin and the base cup.

As will be apparent from FIGS. 4 and 5, the angular movement of the arm 2 is limited in two different ways. First of all, a pin 22 of the arm 2 has only a limited range of rotational movement inside a slot 63 of the base cup. In the tensioner configuration described in the enclosed figures, it is assumed that counter-clockwise rotation (in FIGS. 2, 5 and 7, clockwise in FIG. 4) moves the arm 2 towards the belt and clockwise movement takes the arm 2 away from the belt. Hence, it will recognized that the slot end 63*a* represent the ultimate extreme out position for the tensioner arm 2 and can usually considered as a premounting position of the tensioner arm 2. Similarly, the other slot end 63*b* of the base cup 6 limits the maximum into-the-belt angular position of the tensioner arm 2, generally called as free arm stop since the arm would be resting against this stop at free stage, i.e. when there is no belt or installation pin present due to biasing effect of the biasing force of the main spring 5. In order to control the main spring force, it is important that the angular position of the slot 63 of the base cup 6 is held in a right angular relationship with the slot or hole 64 of the base cup 6 where the bottom tang 51 of the main spring 5 is being anchored.

The second limitation for the arm movement comes from the clutch spring 9. This spring is mounted on and around the pivot shaft 1 in a normal conventional way. In other words, if, for example, the hook shaped top end 91 is pushed clockwise in FIG. 4 (i.e. towards the belt) the clutch spring 9 is being forced to open slightly and, consequently, allowed to rotate on the pivot shaft 1. The rotation of the top end 91 to the opposite direction will lock the clutch spring on the pivot shaft 1 thereby creating so called backstop to protect against tooth skip. As have been shown in FIG. 4, the arm 2 and the clutch spring 9 has been aligned in such a way during the assembly of the tensioner 10, that the top end 91 of the clutch spring 9 lays between the arm pin 22 and the advance stop 23 of the arm 2. The angular space between the pin 22 and the advance stop 23 represent a free stroke travel of the arm 2 during which there is no contact between the arm 2 and the clutch spring 9. This free stroke is generally arranged to be large enough to allow the arm movement caused by the thermal expansion of the engine and certain amount of belt/arm oscillations but to limit the arm movements which would cause too much slackening of the belt resulting in tooth skip. In other words the interaction between the arm 3 will allow the clutch spring to readjust its position during the cold engine runs and or when the belt will age and stretch during its normal life span, but will prohibit the slackening of the belt and the tooth skip even during rough engine running conditions.

Figures 6, 7:
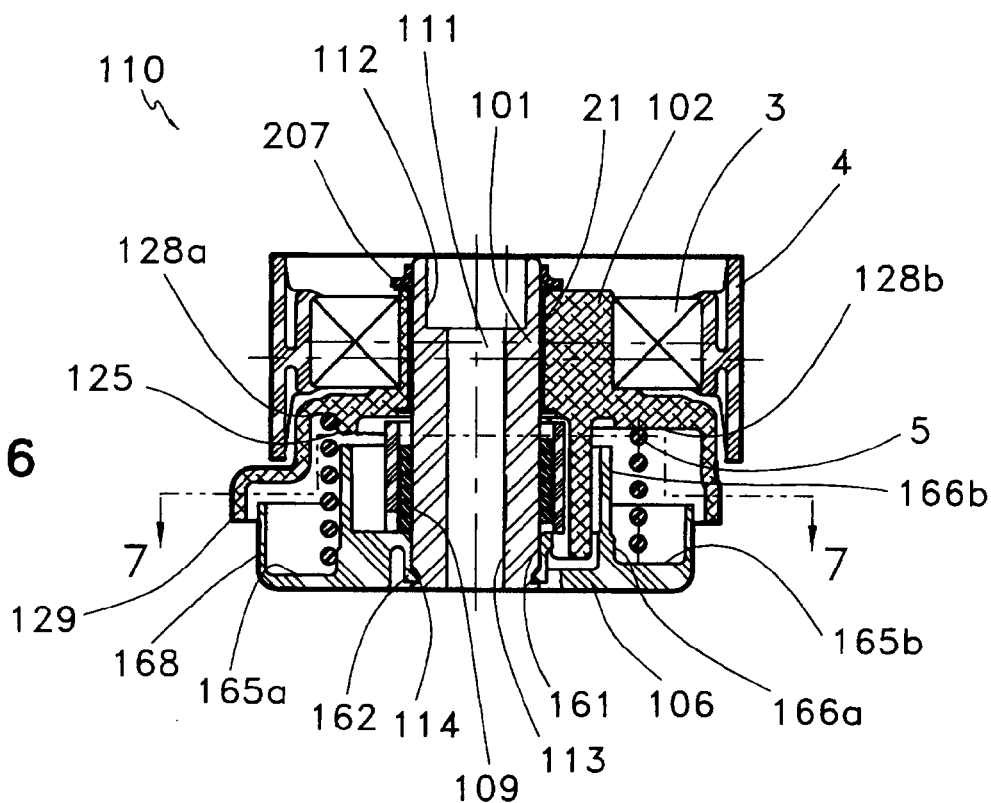
FIG. 6 is a cross-sectional side view of another embodiment of the tensioner with a clutch sleeve.
FIG. 7 is a cross-sectional view taken through the line 7-7 in FIG. 6 emphasizing the positional relation between the arm pin, clutch sleeve and clutch spring.

In FIG. 4, it is also demonstrated how the top end tang 52 of the main spring 5 is locked into a tang support feature 24 of the arm 2, and the spring support ridge 25 of the arm 2 (shown in FIG. 2) is provided as a core support for the function of a torsional spring. FIG. 4 also reveals a through hole 26 for the mounting of the installation pin (45 in FIG. 1). The corresponding installation pin mounting hole 69/169 in the base cup 6 is shown in FIGS. 5 and 7. The base cup 6 also has an upward extended outside wall 68, which is partially encapsulated by the bottom skirt 29 of the arm 2 thereby forming a short labyrinth seal.

Referring to FIGS. 3, 4 and 5, the tensioner 10 also has several features to limit the uncontrolled vibrations of the main spring 5. Both the top end (ceiling) 28*a*, 28*b* and the bottom end (floor) 65*a*, 65*b* of the spring cavity has been arranged to form a helix, which corresponds to the helix of the main spring 5 in its mid-range or near mid-range conditions. These features help the main spring 5 to take its wound-up position without any major distortions or coil to coil contact. The base cup 6 also has a raised centre section 66, which has an outside diameter close to the inside diameter of the main spring 5. The purpose of this centre section 66 is to limit the radial vibration of the centre coils of the main spring 5. The raised centre section is preferably made of soft plastic or elastomer type materials in order to reduce the wear and/or noise of the spring coils when they touch the raised centre section 66. In order to further reduce the contact noise, it is possible to make the raised centre section 66 at least partially flexible and off-round and form thin wing or blade type extensions around its outside periphery. The raised centre section 66 as described in FIGS. 3 and 4 also has a cut-out 67 at the top end of the part to make sure that there will be no interference between the raised centre section 66 and the top tang 91 of the clutch spring 9.

An alternate embodiment 110 is shown in FIGS. 6 and 7. The similar or near similar components and/or features are indicated with the same reference numerals as above. The somewhat different features have a 100 series reference numerals and totally new components have a reference numeral of 200-series. The major differences are as follows: The top plate 7 and the retaining ring 8 has been replaced by a flanged cylinder shape top plate 207 which is press fit over the pivot shaft 101, which does not have a retaining ring groove at the top end of the shaft; The arm 102 has a pin 122 but it does not have a cold stop feature like the arm 2; The cylindrical raised centre section 166*b* of the base cup 106 has a slight reduction in its outside diameter compared to that of the spring support section 166*a*—i.e. the section where the first coil of the main spring 5 gets its support; the clutch spring 109 has a straight radial top tang 191 and the clutch spring 109 is encapsulated by a clutch sleeve 200.

The clutch sleeve 200 has a narrow spring tang groove 201 to accept the radial tang 191 of the clutch spring 109 so that the tang 191 is supported against bending when the clutch sleeve is tried to be forced to rotate clockwise by the pin 122 of the arm 102 as positioned in FIG. 7. The clutch sleeve 200 also has two stop faces 202 and 203 between which the arm pin 122 is totally free to rotate thereby creating a free stroke range of certain arc length. In other words the stop face 202 acts as a backstop and the stop face 203 acts as an advance stop thereby prohibiting the direct, metallic noise creating contact between the arm 102 and the clutch spring 109. It should also appreciated that since the clutch sleeve 200 rotates together with the clutch spring 109 it is possible to minimize the clearance between the bore 204 of the clutch sleeve 200 and the outside diameter of the clutch spring 109, it is possible to prevent erratic over opening of the first coil 193, which would cause major variations to the arc length of the actual free stroke of the arm 102. This a major improvement for the current tensioner designs since the excessive opening of the said first coil 193 before the actual rotation of the clutch spring 109 not only causes the variation in the free stroke but is also a source of long lasting stop contact in the cold engine (i.e. small engine—long belt condition) resulting unnecessary noise and possible component damage.

Because of the both embodiment of the invention shown have the same external functionality as far as their installation and operation in the engine is concerned, the installation and reinstallation procedures are discussed simultaneously for the both designs. During the final assembly of the tensioner 10/110 at the factory the tensioner components are aligned with each other in such a way that the clutch spring hook tang 91 is located within the free stroke arc between the arm pin 22 and the advance stop face 23 (design according to FIGS. 1 to 5) or the arm pin 122 is located between stop faces 202 and 203 of the clutch sleeve 200 (design according to FIGS. 6 and 7) while the arm pins 22/122 are further located inside the slots 63/163 respectively and the arms 2/102 are rotated clockwise until the installation pin 45 can be pushed simultaneously through the pin holes 26 and 69/169 in the arms and the base cups. Since the pivot shaft 1/101 is free to rotate in relation to the base cup 6/106, the arm 2/102 is free to drag the clutch spring 9/109 and the shaft 1/101 into the pre-installation position.

When the tensioner is ready to be installed onto the engine it can be fixed to the proper position by a bolt installed through the centre hole 11/111. The pivot shaft 1/101 can have a counter bore 12/112 in case the available space in the engine does not allow the bolt head stick above the head of the pivot shafts. Providing the base cup 6/106 is made of metal or high strength/high temperature plastics, it is possible to rely on the strength of the base cup 6/106 to hold the bottom tang 51 of the main spring 5 in the proper position, and the base cup must be provided with some anchoring features, such as knobs, teeth or alike (not shown), which can be placed into the corresponding locking/indexing features of the engine. However, if the base cup is made of low cost plastics it is preferred to make the bottom tang 51 of the main spring long enough so that it protrudes outside the main structure of the tensioner 10/110 so that it can be aligned and placed securely into a corresponding spring slot in the engine (not shown). Once the belt is routed around the tensioner and the rest of the belt drive components, the operator can pull out the installation pin 45. The tensioner arm 2/102 will be automatically rotated to the proper running position regardless of the initial engine temperature and/or the belt length.

If the belt and/or tensioner needs to removed from the engine, the service operator initially needs just slightly to slack the mounting bolt so that the pivot shaft 1/101 is free to rotate but is still standing straight and being supported by the mounting bolt. The operator then uses a tool that engages a corresponding feature in the arm 2/102 to turn the arm 2/102 and the attached pulley 4 away from the belt.

Figure 2:
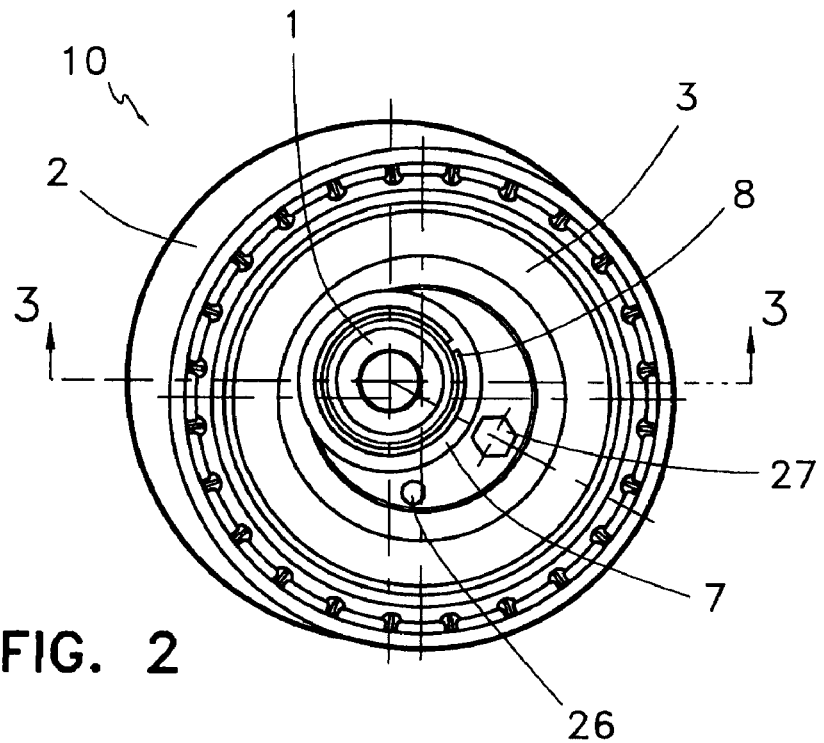
FIG. 2 is a top plan view of tensioner shown in FIG. 1.

In the embodiment shown in FIG. 2 the tool engagement feature is a hexagonal hole 27 located in the top section of the arm 2. However, it should be clear that any other type of engagement arrangement, such as two round holes or any other location that is accessible to the operator, can be used. Once the arm 2/102 has been turned all the way to the installation position, the operator should reinsert the original installation pin 45 or any other pin of a suitable size through the installation pin holes 26 and 69/169 to lock the arm into the installation position. In case the tensioner 10/110 is due to be replaced, it can now be removed from the engine. If the tensioner 10/101 is intended to be reinstalled, the mounting bolt can be immediately retightened after the reinsertion of the installation pin 45, to wait for the reinstallation, e.g. after the installation of a new belt. It should be noted that the tensioner according to the present invention, will allow the reinstallation of an old, stretched belt without any danger of misinstallation, the procedure which is almost impossible when using conventional manually installed tensioner with the alignment index features for a correct running position installation, since these index marks are normally intended for new unstretched belts only. Even if the conventional tensioners have two set of index marks, one for a new belt, the second for a used stretched belt, these cannot ever be precise since the amount of stretch in an used belt is always unknown.

It can thus be appreciated that the objects of the present invention have been fully and effectively accomplished. It is to be understood that the foregoing specific embodiments has been provided to illustrate the structural and functional principles of the present invention and is not intended to be limiting. To the contrary, the present invention is intended to encompass all modifications, substitutions and alterations within the spirit and scope of the appended claims.

What is claimed is:

1. A tensioner comprising:
a pivot shaft configured for mounting on an engine surface;
a tensioner arm mounted on said pivot shaft for pivotal movement between a free arm stop position and a premount stop position;
a belt-engaging pulley mounted for rotation on said tensioner arm;
a base member having a free arm stop and a premount stop, said tensioner arm configured to cooperate with said free arm stop and said premount stop to limit said pivotal movement of said tensioner arm;
a spring coupled between said tensioner arm and said base member, said spring configured for biasing said tensioner arm in a belt-tensioning direction, said spring being fixable relative to said pivot shaft upon said tensioner being placed in a mounted condition;
a one-way clutch directly engaging said pivot shaft and having a lost motion connection with said tensioner arm wherein said tensioner arm moves through a free range without engaging said one-way clutch, said tensioner arm rotating said one-way clutch as said tensioner arm moves beyond the free range towards the free arm stop position and said tensioner arm enabling said one-way clutch as said tensioner arm moves beyond the free range towards the premount stop position, limiting travel of said tensioner arm therebeyond; and
wherein when said pivot shaft is mounted fixedly to the engine surface, said pivot shaft and said one-way clutch are prevented from rotating in one direction relative to the base plate thereby limiting the range of movement of the tensioner arm, and when said pivot shaft is mounted rotatably to the engine surface said tensioner arm, said pivot shaft and said one-way clutch are rotatable in said one direction relative to said base plate.

2. A tensioner according to claim 1, wherein said tensioner further comprises a pin, said pin selectively coupling said tensioner arm and said base member when said tensioner is in an installation condition.

3. A tensioner according to claim 2, wherein said one-way clutch is a one-way wrap-spring clutch.

4. A tensioner according to claim 3, wherein said base member has an arcuate slot therein which defines said free arm stop and said premount stop and wherein said tensioner arm has a stop pin that extends into said arcuate slot.

5. A tensioner according to claim 4, wherein said wrap-spring clutch is arranged to un-wrap and rotate about said pivot shaft when said tensioner arm rotates towards the free arm stop position.

6. A tensioner according to claim 5, wherein said wrap-spring clutch has a radially extending tang having a semi-circular shape and said stop pin of said tensioner arm has a contact surface complementarily shaped to said semi-circular shape of said radially extending tang.

7. A tensioner according to claim 3 wherein one-way clutch further comprises a clutch sleeve encapsulating said one-way spring.

8. A tensioner according to claim 7 wherein said clutch sleeve has two radially extending stop faces defining an arcuate free stroke space therebetween, said stop pin of said tensioner arm positioned to travel in said arcuate free stroke space.

9. A tensioner according to claim 7, wherein said clutch sleeve has less than 0.5 mm radial clearance between an inside bore of said clutch sleeve and an outside diameter of said wrap-spring clutch.

10. A tensioner according to claim 1, wherein said spring is a torsional helical spring having a pitch, said tensioner arm having a top face receiving an end of said helical spring and said base having bottom face receiving an opposite end of said helical spring, wherein at least one of the said top face and bottom face is formed into a shape of a helix having said pitch similar.

11. A tensioner according to claim 1, further comprising a spring support that is surrounded by the spring, wherein the spring support is sized to limit radial vibration of at least centre coils of the spring during use.

12. A tensioner according to claim 11, wherein the spring support is made a material selected from the group consisting of a plastic material and an elastomer material.

\* \* \* \* \*